(12) United States Patent
Stoller et al.

(10) Patent No.: US 6,216,387 B1
(45) Date of Patent: Apr. 17, 2001

(54) DEVICE FOR AND METHOD OF PLANT SUPPORT AND FERTILIZER DELIVERY

(76) Inventors: Nahum Stoller, 17920 Alon, Hagalil; Rami Curiel, 6 Nivtza Kadesh, Tel Aviv, both of (IL)

(\*) Notice: Subject to any disclaimer, the term of this patent is extended or adjusted under 35 U.S.C. 154(b) by 0 days.

(21) Appl. No.: 09/315,838

(22) Filed: May 21, 1999

(51) Int. Cl.$^7$ ................................................... A01G 29/00
(52) U.S. Cl. ............................................................. 47/48.5
(58) Field of Search ........................ 47/47, 48.1; D8/1; 111/92

(56) References Cited

U.S. PATENT DOCUMENTS

| | | | |
|---|---|---|---|
| 291,569 | * 1/1884 | Borner | 47/47 |
| D. 375,663 | * 11/1996 | Arnold | D8/1 |
| D. 379,417 | * 5/1997 | Vachon | D8/1 |
| 2,124,049 | * 7/1938 | Battista et al. | 47/47 |
| 2,174,955 | * 10/1939 | Wade | 47/47 |
| 3,061,976 | * 11/1962 | Carroll et al. | 47/47 |
| 3,345,774 | * 10/1967 | Delbuguet | 47/48.5 |
| 3,903,815 | * 9/1975 | Winkler | 111/92 |
| 4,870,781 | * 10/1989 | Jones | 47/43 |
| 4,881,342 | * 11/1989 | Ferguson | 47/47 |
| 5,335,448 | * 8/1994 | Martinez et al. | 47/47 |

\* cited by examiner

*Primary Examiner*—Charles T. Jordan
*Assistant Examiner*—Francis T. Palo
(74) *Attorney, Agent, or Firm*—Mark M. Friedman

(57) ABSTRACT

A device and method for supporting and fertilizing trees or plants, are provide. The device includes (a) a base element having walls defining a cavity for holding a releasable fertilizer therein, the walls being formed with at least one opening for releasing the releasable fertilizer, the base element being shaped and designed insertable into a ground through the ground's surface; (b) a pole being connected to, or integrally formed with, the base element through a first end of the pole; and (c) a plant engaging mechanism being connected to, or integrally formed with, the pole, the plant engaging mechanism being of a length such that a terminal end of the plant engaging mechanism is less than 50 cm away from the pole, such that when the device is used for supporting a plant, the base element is positioned less than 50 cm away from the plant, so as to provide for efficient fertilization of the plant by the releasable fertilizer.

1 Claim, 3 Drawing Sheets

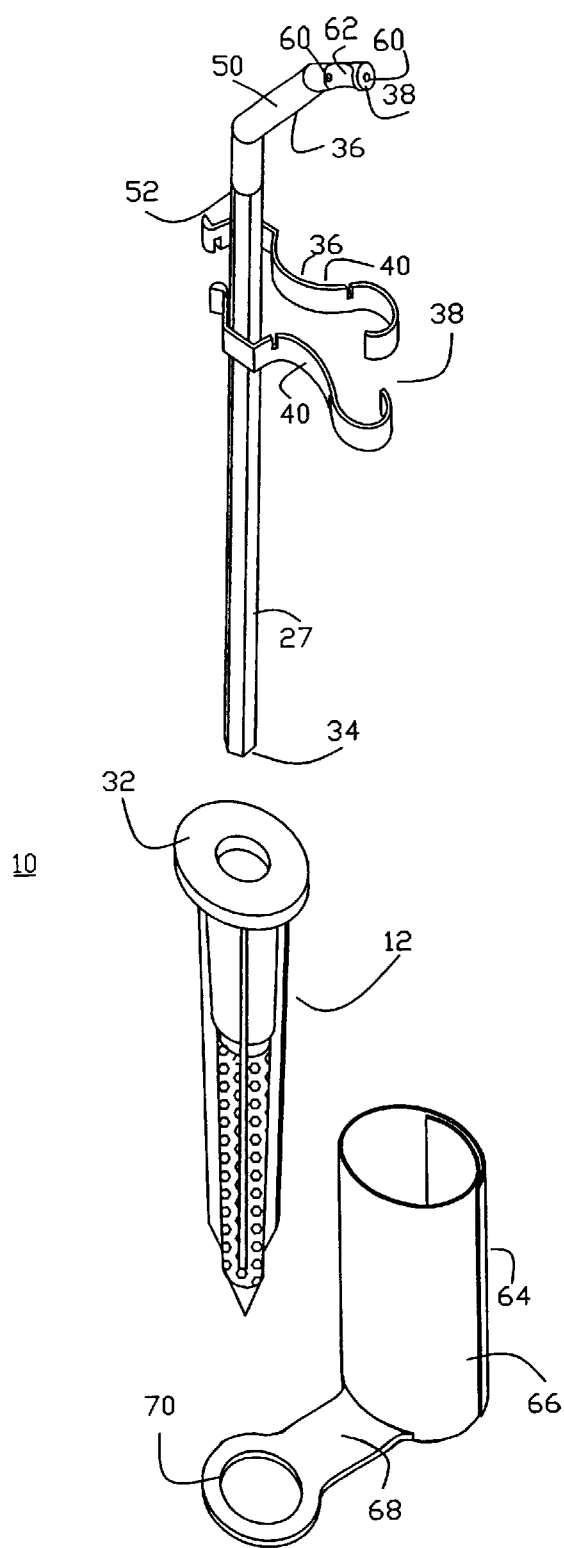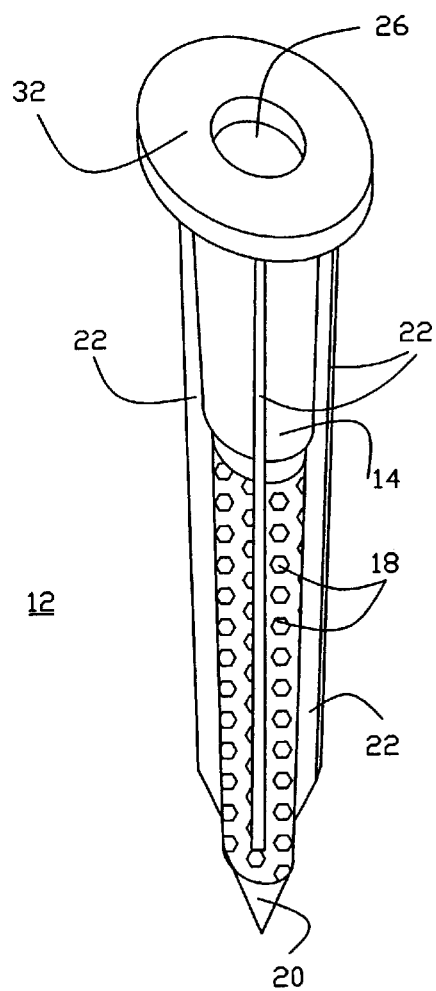
Fig. 1
Fig. 2

DEVICE FOR AND METHOD OF PLANT SUPPORT AND FERTILIZER DELIVERY

FIELD AND BACKGROUND OF THE INVENTION

The present invention relates to a device which holds plants or trees substantially vertical against wind and other forces of nature. More particularly, the present invention relates to a multifunctional device which supports the stem of a plant above ground level, protects the base of the stem from damage close to and at ground level, and efficiently applies fertilizer to the roots of the plant under ground level, which device is designed for maximizing access to the growing plants for both personnel and equipment.

It is common practice in commercial agriculture to grow young plants, such as tree plants, in one location at relatively high density and to transfer them later for cultivation in another location at a lower density. Depending on the type of plant involved, support of the main stem and/or branches may be required before transfer, after transfer, or both before and after transfer. For other plants no transfer is required but support of the young plants is necessary until the main stem or trunk becomes strong enough to resist wind and other natural forces.

The need for stabilizers or support devices for young plants being grown commercially is well recognized and many previous technologies have tried to address this need. The prior art can be divided into those devices which require multiple points of attachment to the ground (e.g., U.S. Pat. Nos. 332,729; 4,562,662; 4,649,666; 4,870,781; 5,129,179; and 5,402,600) and those devices which require only a single point of attachment to the ground (e.g., U.S. Pat. Nos. 349,435; 4,738,050; 4,881,342; 5,335,448; and 5,605,010).

Devices with multiple points of attachment to the ground are effective in preventing rotation of the supported plant with respect to the support device, however, they require more labor to install and make it more difficult for workers and equipment to move freely about the production area. Both additional labor and restriction of movement in the growing area therefore constitute an inherent disadvantage of such devices.

Prior art devices with single points of attachment to the ground allow the plant to rotate with respect to the support device, but are installed with less labor and allow more freedom of movement in the growing area after installation. Thus efficiency in preventing rotation of the plant has previously been sacrificed in order to reduce the labor associated with installation and permit greater freedom of movement in the growing area.

One device extant in the prior art combines the function of fertilizer application with the function of plant support (U.S. Pat. No. 4,870,781). This prior art device relies on multiple points of attachment to the ground, with the associated disadvantages described above. Furthermore, this device is ineffective with respect to fertilizer delivery because it relies on trios of stakes containing fertilizer which are installed at a great distance from the plant to be fertilized.

Since the fertilizer diffuses through the ground radially away from the stakes, roughly two thirds of the fertilizer from each stake moves away from the plant to be fertilized. The efficiency of delivery which may be achieved by placing a delivery device close to the base of a plant has been recognized in the prior art (U.S. Pat. No. 5,605,010), but only with respect to water, not fertilizer.

The prior art also includes devices for protecting the trunks of trees (U.S. Pat. Nos. D403,929; 5,819,468; 5,048, 229; and D298,998), although not in conjunction with the support of said trees. These prior art devices are designed primarily for use with adult trees which are growing slowly.

There is thus a great need for, and it would be extremely advantageous to have, a plant support device with a single point of attachment to the ground, capable of supporting the plant in a non-rotatable fashion while simultaneously delivering fertilizer to the supported plant in an efficient manner and protecting the base of the plant from mechanical and chemical damage.

SUMMARY OF THE INVENTION

According to one aspect of the present invention there is provided a device for supporting and fertilizing trees or plants, the device comprising (a) a base element having walls defining a cavity for holding a releasable fertilizer therein, the walls being formed with at least one opening for releasing the releasable fertilizer, the base element being shaped and designed insertable into a ground through the ground's surface; (b) a pole being connected to, or integrally formed with, the base element through a first end of the pole; and (c) a plant engaging mechanism being connected to, or integrally formed with, the pole, the plant engaging mechanism being of a length such that a terminal end of the plant engaging mechanism is less than 50 cm away from the pole, such that when the device is used for supporting a plant, the base element is positioned less than 50 cm away from the plant, so as to provide for efficient fertilization of the plant by the releasable fertilizer.

According to another aspect of the present invention there is provided a method of supporting and fertilizing a plant, the method comprising the steps of (a) engaging a protective sleeve having a spacer ending with a ring around a portion of the plant, the portion being close to, and above, a ground; (b) substantially vertically inserting into the ground, through the ring, a base element having walls defining a cavity holding a releasable fertilizer therein, the walls being formed with at least one opening for releasing the releasable fertilizer, the base element being shaped and designed insertable into a ground through the ground's surface; (c) connecting a pole to the base element through a first end of the pole; (d) connecting a plant engaging mechanism to the pole, the plant engaging mechanism being of a length such that a terminal end of the plant engaging mechanism is less than 50 cm away from the pole, such that the base element is positioned less than 50 cm away from the plant, so as to provide for efficient fertilization of the plant by the releasable fertilizer; and (e) engaging a second portion of the plant to the plant engaging mechanism.

According to further features in preferred embodiments of the invention described below, the length of the plant engaging mechanism is selected such that the terminal end of the plant engaging mechanism is less than 40 cm away from the pole.

According to still further features in the described preferred embodiments the length of the plant engaging mechanism is selected such that the terminal end of the plant engaging mechanism is less than 30 cm away from the pole.

According to still further features in the described preferred embodiments the length of the plant engaging mechanism is selected such that the terminal end of the plant engaging mechanism is less than 25 cm away from the pole.

According to still further features in the described preferred embodiments the length of the plant engaging mechanism is selected such that the terminal end of the plant engaging mechanism is less than 20 cm away from the pole.

According to still further features in the described preferred embodiments the cavity is divided into an upper portion which serves for engaging the pole and a lower portion which serves for holding the releasable fertilizer, the base element includes a cover for covering the lower portion.

According to still further features in the described preferred embodiments the base element includes longitudinal fins.

According to still further features in the described preferred embodiments the base element is formed with a pointed end.

According to still further features in the described preferred embodiments the base element includes a collar for preventing sinking of the base element into the ground.

According to still further features in the described preferred embodiments the pole is polygonal in cross section.

According to still further features in the described preferred embodiments the pole is hexagonal in cross section.

According to still further features in the described preferred embodiments the pole is of a height of 120–250 cm.

According to still further features in the described preferred embodiments the plant engaging mechanism includes a pair of hook elements attachable to the pole at a desired height.

According to still further features in the described preferred embodiments each of the hook elements of the pair of hook elements includes a snap mechanism snappably engaging the pole, a spacer and a hook.

According to still further features in the described preferred embodiments each of the hook elements of the pair of hook elements is formed with cutouts for accepting the other hook element of the pair, so as to form a bi-hook structure for engaging the plant.

According to still further features in the described preferred embodiments the plant engaging mechanism includes an angled arm connected to, or integrally formed with a second end of the pole.

According to still further features in the described preferred embodiments the angled arm forms an angle of 100–140° with the pole.

According to still further features in the described preferred embodiments the angled arm is formed with at least one hole for accepting a string therethrough.

According to still further features in the described preferred embodiments the device further comprising a protective sleeve engagable by the device for protecting portions of the plant which are close to, and just above, the ground.

According to still further features in the described preferred embodiments the protective sleeve includes an elastic openable cylinder-like element.

According to still further features in the described preferred embodiments the protective sleeve further includes a spacer connected to, or integrally formed with, the cylinder-like element, the spacer ends with a ring for engaging the device.

According to still further features in the described preferred embodiments the base element, the pole and the plant engaging mechanism are made of plastic.

The present invention successfully addresses the shortcomings of the presently known configurations by providing a plant support device with a single point of attachment to the ground, capable of supporting the plant in a non-rotatable fashion while simultaneously delivering fertilizer to the supported plant in an efficient manner and protecting the base of the plant from mechanical and chemical damage.

BRIEF DESCRIPTION OF THE DRAWINGS

The invention herein described, by way of example only, with reference to the accompanying drawings, wherein:

FIG. 1 is a perspective view of the components making a device for supporting and fertilizing a plant according to preferred embodiments of the present invention;

FIG. 2 is a perspective view of a base element employed with the device for supporting and fertilizing a plant according to preferred embodiments of the present invention;

DESCRIPTION OF THE PREFERRED EMBODIMENTS

Figure 3:
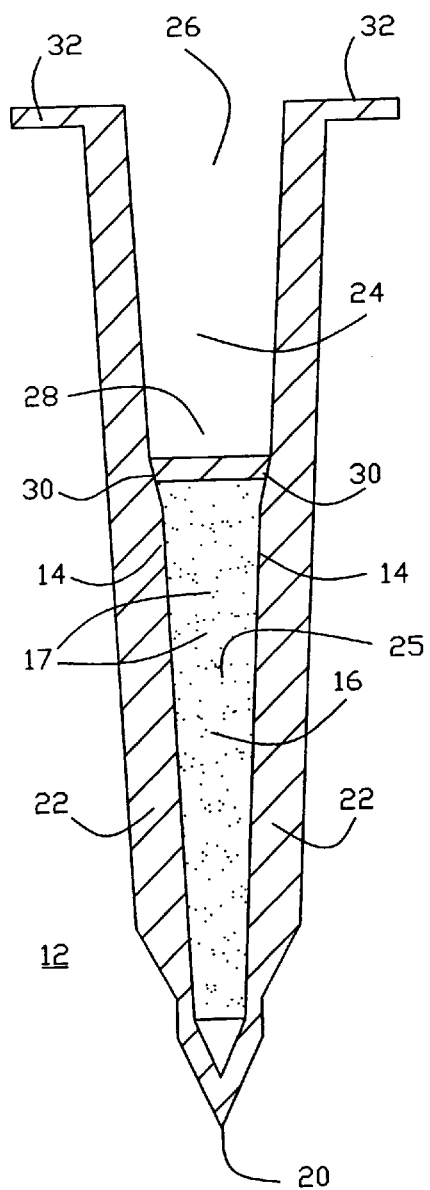
FIG. 3 is a longitudinal cross view of the base element employed with the device for supporting and fertilizing a plant according to preferred embodiments of the present invention.

The present invention is of a device and method which can be used to support and fertilize a plant. Specifically, the present invention can be used to provide for plant support via a single point of attachment to the ground, capable of supporting the plant in a non-rotatable fashion while simultaneously delivering fertilizer to the supported plant in an efficient manner and protecting the base of the plant from mechanical and chemical damage.

As used herein in the specification and in the claims section that follows, the term "plant" refers to any member of the kingdom Plantae, comprising multicellular organisms that produce food from sunlight and inorganic matter by the process of photosynthesis and that have rigid cell walls containing cellulose. In particular the term refers to young trees having a trunk which needs mechanical support in order to grow substantially vertically.

As used herein in the specification and in the claims section that follows, the term "fertilizer" includes any substance or combination of substances used to fertilize the soil, including, but not limited to, minerals and substances rich in nitrogenous compounds. The term thus includes also slow release fertilizers which are substances which release their fertilizing content in a slow fashion over a prolonged time period. The term further include such fertilizers contained in a container or bag.

The principles and operation of a device and method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates a device for supporting and fertilizing a plant according to the teachings of the present invention, which device is referred to hereinunder as device 10.

Device 10 according to the present invention includes a base element 12, which is shown in greater detail in FIGS. 2–3 to have walls 14 defining a cavity 16 therein. Cavity 16 serves for holding a releasable fertilizer 17 therein, whereas walls 14 are formed with at least one opening 18, a plurality of openings 18 are shown in FIG. 2, which, as further detailed hereinunder, serve for releasing the fertilizer therethrough to the soil.

Base element 12 of device 10 is shaped and designed insertable into a ground through the ground's surface. Thus, according to preferred embodiments of the present invention, base element 12 is a narrowing construction formed with a pointed end 20. To ensure its vertical insertion into the ground, base element 12 is further formed with longitudinal fins 22 of a material of sufficient structural rigidity, such as tough plastic material. Fins 22 also serve to prevent rotation of device 10 during service.

According to a preferred embodiment of the present invention, cavity 16 is divided into an upper portion 24 and a lower portion 25. Upper portion 24 of cavity 16 serves for engaging a pole 27 (FIG. 1), the design of which is further described hereinunder. To this end, upper portion 24 of cavity 16 is shaped and designed to intimately accept and support pole 27 through a main opening 26 formed at an upper end of element 12. Lower portion 25 of cavity 16 serves for holding releasable fertilizer 17, which releases during service from openings 18. A cover 28 preferably serves for covering lower portion 25, thereby separating lower portion 25 from upper portion 24. Cover 28 preferably rests on a circumferential protrusion 30 formed in the inner side of walls 14 and protruding into cavity 16 at the interface between upper portion 24 and lower portion 25. Cover 28 is preferably biased by walls 14 and is therefore anchored to its position. Covering lower portion 25 with cover 28 ensures that should element 12 be turned upside down, releasable fertilizer 17 will not spill through main opening 26.

According to another preferred embodiment of the present invention base element 12 is formed with a collar 32 which circumferences main opening 26. Collar 32 prevents sinking of base element 12 into the ground.

Figure 4:
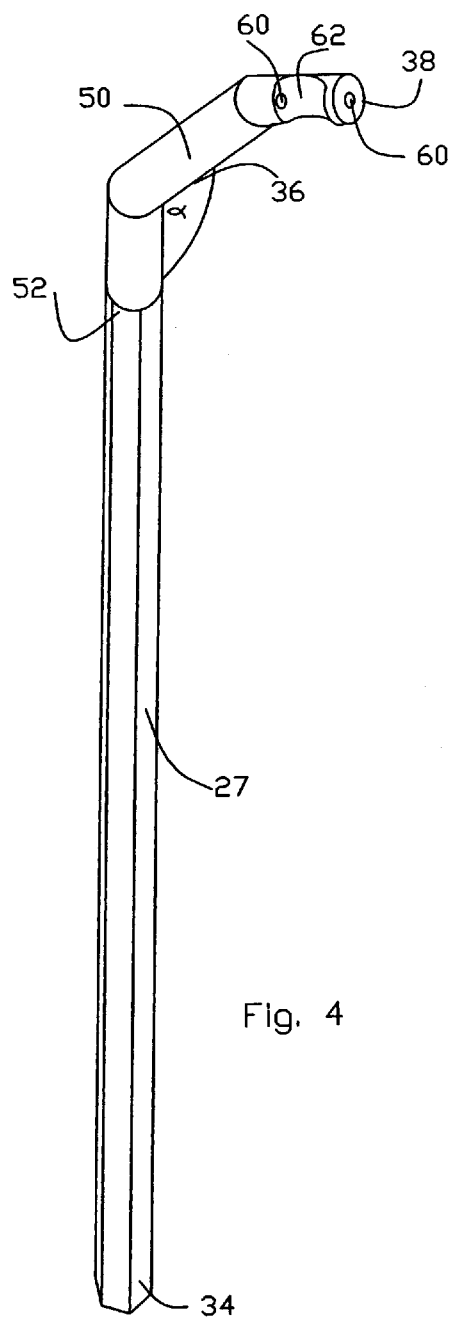
FIG. 4 is a perspective view of a pole and one configuration of a plant engaging mechanism employed with the device for supporting and fertilizing a plant according to preferred embodiments of the present invention.

As already mentioned, device 10 according to the present invention includes pole 27, which is shown in more detail in FIG. 4. Pole 27 is preferably connected to base element 12 through a first end 34 of pole 27. Connecting pole 27 to base element 12 is effected according to preferred embodiments of the present invention by inserting end 34 of pole 27 through main opening 26 into upper cavity 24. It will, however, be appreciated that according to other designs, pole 27 can be integrally formed with base element 12. For reasons further detailed hereinunder pole 27 is preferably polygonal in cross section, most preferably hexagonal in cross section. Pole 27 is preferably of a height of 120–250 cm and according to some embodiments can be height adjustable. Height adjustability can be effected, for example, by providing pole 27 with at least two pole members one is retractable into/extendible from the other and a locking mechanism, e.g., a suitable locking screw, for fixating the pole members at a desired position. In any case, pole 27 is preferably hollow, so as to reduce the total weight, material demand and cost of device 10.

Figure 5:
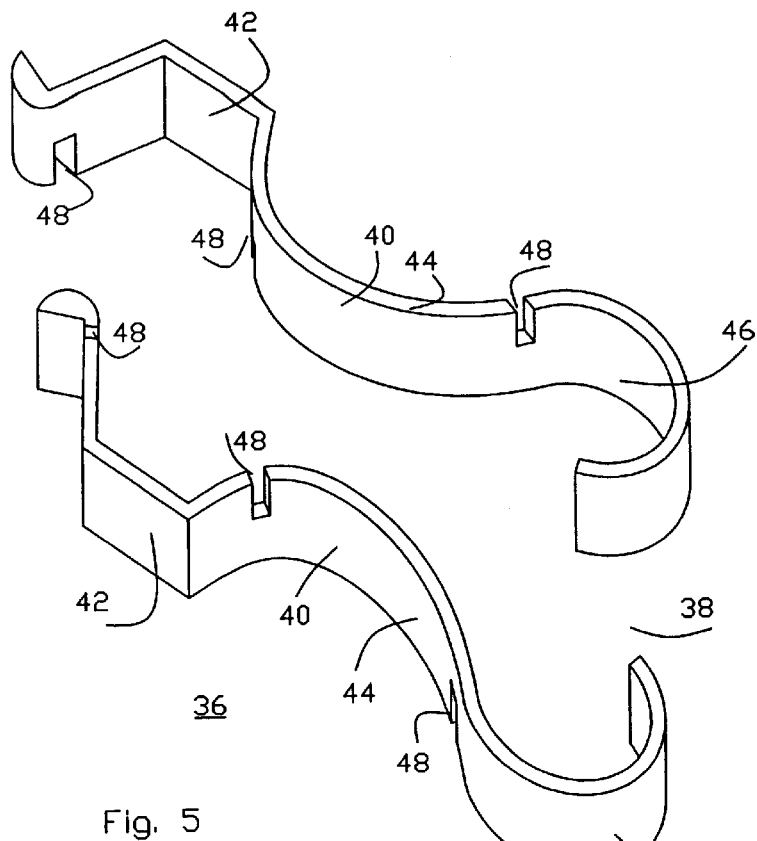
FIG. 5 is a perspective view of another configuration of a plant engaging mechanism employed with the device for supporting and fertilizing a plant according to preferred embodiments of the present invention.

Device 10 according to the present invention further includes a plant engaging mechanism or mechanisms 36, shown in more detail in FIGS. 4–5. Plant engaging mechanism or mechanisms 36 are connected to, or integrally formed with, pole 27.

According to the present invention, and in sharp distinction from the prior art described in the Background section hereinabove, plant engaging mechanism or mechanisms 36 are of a length selected such that a terminal end 38 of plant engaging mechanism is less than 50 cm, preferably, less than 40 cm, more preferably, less than 30 cm, most preferably less than 25 cm, for some applications, ideally less than or about 20 cm, away from pole 27, such that when device 10 is used for supporting a plant, base element 12 is positioned less than 50 cm, preferably, less than 40 cm, more preferably, less than 30 cm, most preferably less than 25 cm, for some applications, ideally less than or about 20 cm, away from the plant, so as to provide for efficient fertilization of the plant by releasable fertilizer 17.

According to one embodiment of the present invention, as best seen in FIGS. 1 and 5, plant engaging mechanism 36 includes a pair of hook elements 40 which are attachable to pole 27 at any desired height and orientation. To this end, each of hook elements 40 includes a snap mechanism 42 for snappably engaging pole 27, a spacer 44 and a hook 46. In the preferred and illustrated embodiment, snap mechanism 42 is an base-less trapezium structure designed to snappably engage three faces of hexagonal pole 27. Each of hook elements 40 is formed according to preferred embodiments with cutouts 48 designed for accepting the other hook element 40, so as to form a bi-hook structure for engaging the plant and to stabilize and anchor mechanisms 42 to pole 27.

According to an alternative or an additional embodiment, plant engaging mechanism 36 includes a n angled arm 50 connect ed to, or integrally formed with a second end 52 of pole 27. According to a preferred embodiment angled arm 50 forms an angle a of 100–140°, preferably about 120°, with pole 27. Angled arm 50 is preferably formed with at least one hole 60, two are shown, which serve for accepting a string (e.g., rope, cable, band, such as elastic band, etc.) therethrough which string serves for anchoring the plant therewith. Angled arm 50 is preferably formed with a groove 62 for engaging the plant therein. According to the present invention, angled arm 50 can be used either alone or in combination with pair of hook elements 40 to support the plant.

Figure 6:
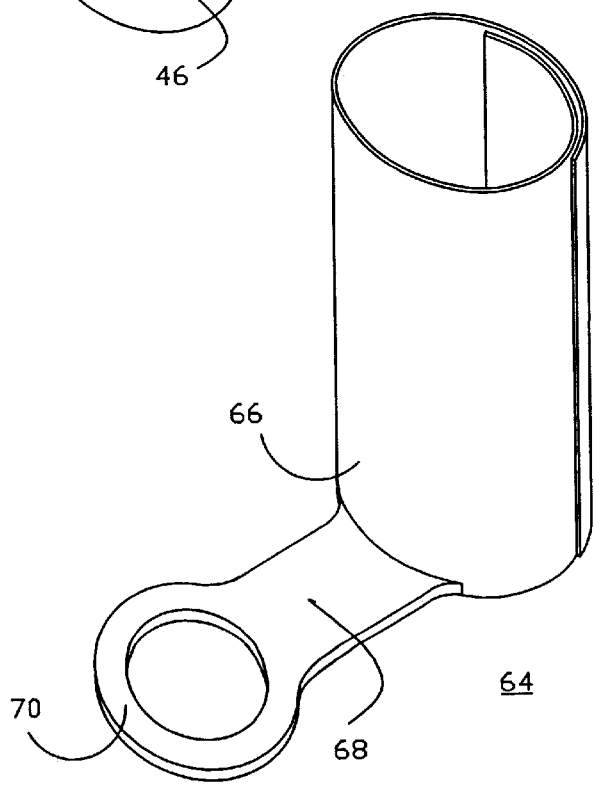
FIG. 6 is a perspective view of a protective sleeve employed with the device for supporting and fertilizing a plant according to preferred embodiments of the present invention.

According to a preferred embodiment of the present invention device 10 further includes a protective sleeve 64, which is shown in more detail in FIG. 6. Protective sleeve 64 is engagable by device 10 and serves for protecting portions of the plant which are close to, and just above, the ground from mechanical damage inflicted by mechanical weeding and from chemical damage inflicted by chemical weeding. According to a preferred embodiment of the present invention protective sleeve 63 includes an elastic openable cylinder-like element 66, so as to allow to position element 66 around the lower portion of the plant. Protective sleeve 64 further includes a spacer 68 connected to, or integrally formed with, cylinder-like element 66, which spacer 68 ends with a ring 70 for engaging device 10. The length of spacer 68 including ring 70 is selected less than 50 cm, preferably, less than 40 cm, more preferably, less than 30 cm, most preferably less than 25 cm, for some applications, ideally less than or about 20 cm, so as to enable the positioning of device 10 less than 50 cm, preferably, less than 40 cm, more preferably, less than 30 cm, most preferably less than 25 cm, from the plant, to thereby provide for most efficient fertilization during service. The optimal distance depends on type and concentration of the fertilizer employed, the type of soil, and the watering program.

The assembly and use of device 10 according to its preferred and illustrated embodiments are effected according to the present invention by first engaging protective sleeve 64 around a portion of the plant, which portion is close to, and above, the ground, i.e., the trunk base. Then, base element 12 is substantially vertically inserted (e.g., pounded) into the ground through ring 70 of sleeve 64, so as to prevent the removal of sleeve 64 by collar 32. Then, pole 27 is connected to base element 12 through main opening 26 and first end 34 of pole 27. Thereafter, plant engaging mechanism(s) 36 are connected to pole 27 and a second portion of the plant is engaged to plant engaging mechanism (s) 36. Other orders can be employed in the assembly and use of device 10. It will, however, be appreciated that using sleeve 64 as described provides for fail-safe optimal distance of the plant from device 10, which ensures optimal fertilization.

The present invention has additional advantages over prior art configurations by providing a plant support device with a single point of attachment to the ground, capable of supporting the plant in a non-rotatable fashion while simultaneously delivering fertilizer to the supported plant in an efficient manner and protecting the base of the plant from mechanical and chemical damage.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method of supporting and fertilizing a plant, the method comprising the steps of:

(a) engaging a protective sleeve having a spacer ending with a ring around a portion of the plant, said portion being close to, and above, a ground;

(b) substantially vertically inserting into the ground, through said ring, a base element having walls defining a cavity holding a releasable fertilizer therein, said walls being formed with at least one opening for releasing said releasable fertilizer, said base element being shaped and designed insertable into a ground through said ground's surface;

(c) connecting a pole to said base element through a first end of said pole; and (d) connecting a plant engaging mechanism to said pole, said plant engaging mechanism being of a length such that a terminal end of said plant engaging mechanism is less than 50 cm away from said pole, such that said base element is positioned less than 50 cm away from the plant, so as to provide for efficient fertilization of said plant by said releasable fertilizer; and (e) engaging a second portion of said plant to said plant engaging mechanism.

* * * * *